United States Patent
Bilan et al.

(10) Patent No.: US 9,304,719 B1
(45) Date of Patent: Apr. 5, 2016

(54) REDUCING PRINT START DELAYS FOR LARGE PORTABLE DOCUMENT FORMAT PRINT JOBS

(71) Applicants: Thomas Nathan Bilan, Longmont, CO (US); Gerald Donald Boldt, Longmont, CO (US); Michael Glen Lotz, Longmont, CO (US); Joseph Wayne Stradling, Firestone, CO (US); Marquis G. Waller, Beverly, OH (US)

(72) Inventors: Thomas Nathan Bilan, Longmont, CO (US); Gerald Donald Boldt, Longmont, CO (US); Michael Glen Lotz, Longmont, CO (US); Joseph Wayne Stradling, Firestone, CO (US); Marquis G. Waller, Beverly, OH (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/557,276

(22) Filed: Dec. 1, 2014

(51) Int. Cl.
*G06F 3/12* (2006.01)
*G06K 15/02* (2006.01)

(52) U.S. Cl.
CPC ............ *G06F 3/1214* (2013.01); *G06F 3/1206* (2013.01); *G06F 3/126* (2013.01); *G06F 3/1217* (2013.01); *G06F 3/1241* (2013.01); *G06F 3/1248* (2013.01); *G06F 3/1251* (2013.01); *G06F 3/1275* (2013.01); *G06F 3/1282* (2013.01); *G06F 3/1298* (2013.01)

(58) Field of Classification Search
None
See application file for complete search history.

(56) References Cited

U.S. PATENT DOCUMENTS

| | | | |
|---|---|---|---|
| 5,970,222 A | 10/1999 | Gusmano et al. | |
| 6,084,688 A * | 7/2000 | Stumbo | G06K 15/00 358/1.16 |
| 6,488,423 B1 * | 12/2002 | Komine | G06K 15/02 400/62 |
| 7,411,692 B2 | 8/2008 | Ferlitsch | |
| 7,872,767 B2 * | 1/2011 | Klassen | 358/1.15 |
| 7,880,913 B2 | 2/2011 | Ford et al. | |
| 7,948,651 B2 | 5/2011 | Truong et al. | |
| 8,027,045 B2 | 9/2011 | Smith | |
| 2002/0097428 A1 * | 7/2002 | Ferlitsch | 358/1.15 |
| 2003/0103777 A1 * | 6/2003 | Nakamura et al. | 399/82 |
| 2003/0208607 A1 * | 11/2003 | Yamazaki | 709/229 |
| 2005/0024673 A1 * | 2/2005 | Sakai | 358/1.14 |

(Continued)

FOREIGN PATENT DOCUMENTS

| | | | | |
|---|---|---|---|---|
| EP | 2372526 A2 * | 10/2011 | | G06F 3/12 |
| JP | 11-110171 | * 4/1999 | | G06F 3/12 |

(Continued)

OTHER PUBLICATIONS

B2BeDocuments™ SmartPDFPrintware™, http://www.b2bedocuments.com/SmartPDFPrintware, Mar. 5, 2015.

(Continued)

*Primary Examiner* — Beniyam Menberu
(74) *Attorney, Agent, or Firm* — Duft Bornsen & Fettig LLP

(57) ABSTRACT

Systems and methods are provided for dynamically splitting print jobs to reduce the time taken to start printing those jobs. One embodiment is a print server that includes an interface that receives a Portable Document Format (PDF) print job. The print server also includes a job controller that determines a size of the PDF print job, and estimates a delay to start marking a first page of the PDF print job. In response to determining that the delay exceeds a threshold, the job controller splits the PDF print job into segments by: generating a first PDF segment that has a delay to start marking the first page that is less than the threshold, and includes a PDF page tree; transmitting the first PDF segment to the printer; generating an additional PDF segment that includes an additional PDF page tree; and transmitting the additional PDF segment to the printer.

20 Claims, 6 Drawing Sheets

(56) References Cited

U.S. PATENT DOCUMENTS

| | | | |
|---|---|---|---|
| 2006/0215185 A1* | 9/2006 | Van Den Tillaart | 358/1.1 |
| 2008/0231885 A1* | 9/2008 | Truong et al. | 358/1.15 |
| 2009/0051947 A1* | 2/2009 | Kuroshima | 358/1.9 |
| 2009/0091774 A1* | 4/2009 | Burkes et al. | 358/1.13 |
| 2010/0053664 A1* | 3/2010 | Mandel et al. | 358/1.15 |
| 2010/0103444 A1 | 4/2010 | Farrell et al. | |
| 2011/0170132 A1* | 7/2011 | Mori | 358/1.15 |
| 2012/0120438 A1* | 5/2012 | Sato | 358/1.15 |
| 2013/0100486 A1 | 4/2013 | McCoog et al. | |
| 2013/0129372 A1* | 5/2013 | Manabe | 399/82 |
| 2014/0013267 A1* | 1/2014 | Stepanov | G06F 3/147 715/776 |
| 2014/0085649 A1 | 3/2014 | Hohensee et al. | |
| 2014/0146354 A1* | 5/2014 | Tanaka et al. | 358/1.15 |
| 2014/0333947 A1* | 11/2014 | Robinson et al. | 358/1.13 |

FOREIGN PATENT DOCUMENTS

| | | | |
|---|---|---|---|
| JP | 2000-322209 | * 11/2000 | G06F 3/12 |
| JP | 2011113178 | 6/2011 | |

OTHER PUBLICATIONS

EFI Fiery Central, http://w3.efi.com/resources/~/media/Files/EFI/Fiery/Fiery%20Central/Fiery_Central_Brochure_US.ashx.

Everlast AuotSplit Plug In, http://www.evermap.com/autosplit.asp, Mar. 5, 2015.

Objectif Lune's Planetpress Suite, Objectif Lune Incorporated, © 2009.

Ricoh RPD Mailroom Integrity, http://www4.infoprintsolutionscompany.com/help/index.jsp?topic=%2Fcom.infoprint.rpd.aix.pdfw%2Fpdfw_c_extov.html, Mar. 5, 2015.

* cited by examiner

REDUCING PRINT START DELAYS FOR LARGE PORTABLE DOCUMENT FORMAT PRINT JOBS

FIELD OF THE INVENTION

The invention relates to the field of printing, and in particular, to Portable Document Format (PDF) print jobs.

BACKGROUND

Entities with substantial printing demands typically use a production printer. A production printer is a high-speed printer used for volume printing (e.g., one hundred pages per minute or more). Production printers include continuous-forms printers that print on a web of print media stored on a large roll.

A production printer typically includes a localized print controller that controls the overall operation of the printer, and a print engine (sometimes referred to as an "imaging engine" or a "marking engine"). The print engine includes one or more printhead assemblies, with each assembly including a printhead controller and a printhead (or array of printheads). An individual printhead includes multiple (e.g., hundreds of) tiny nozzles that are operable to discharge ink as controlled by the printhead controller.

Production printers typically have limited memory capacities for storing print data. This may cause a problem when a printer receives a print job in the PDF format, because a printer cannot initiate printing for a PDF print job until the entire PDF file has been stored in memory at the printer. Specifically, printing for a PDF print job (that is, the act of physically marking "dots on a page") cannot start until page tree information for the job is read by the printer, and the location of the page tree information for a PDF print job is defined at the end of the PDF file for the print job. This results in two problems for a production printer receiving a large PDF print job from a print server. First, since the entire PDF file must be loaded into memory at the printer before printing initiates, the printer is idle for the entire period in which it is receiving a print job. This means that for large print jobs, the print shop must wait for a long period of time (e.g., an hour) before the first page even starts printing. Second, if the PDF document is too large for the memory of the printer (e.g., 120,000 pages), the memory of the printer overflows before the entire job is loaded, meaning that printing for the job fails.

SUMMARY

Embodiments described herein identify PDF print jobs that are so large they will cause a substantial processing delay at a printer, and split these PDF print jobs into smaller independent PDF jobs/segments that each may be processed quickly by the printer. Because the PDF segments are smaller than the original job, the printer may quickly access page tree information for these segments, meaning that the printer spends less time idle before printing/marking the first page of the original PDF print job.

One embodiment is a system comprising a print server. The print server includes an interface that is able to receive a Portable Document Format (PDF) print job. The print server also includes a job controller that is able to determine a size of the PDF print job, and to estimate a delay to start marking a first page of the PDF print job at a printer based on the size. The job controller is further able, in response to determining that the delay exceeds a threshold, to split the PDF print job into segments by: generating a first PDF segment that has a delay to start marking the first page that is less than the threshold, where the first PDF segment defines pages from the PDF print job and includes a PDF page tree; transmitting the first PDF segment to the printer for printing; generating an additional PDF segment that defines additional pages of the PDF print job and includes an additional PDF page tree; and transmitting the additional PDF segment to the printer.

Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
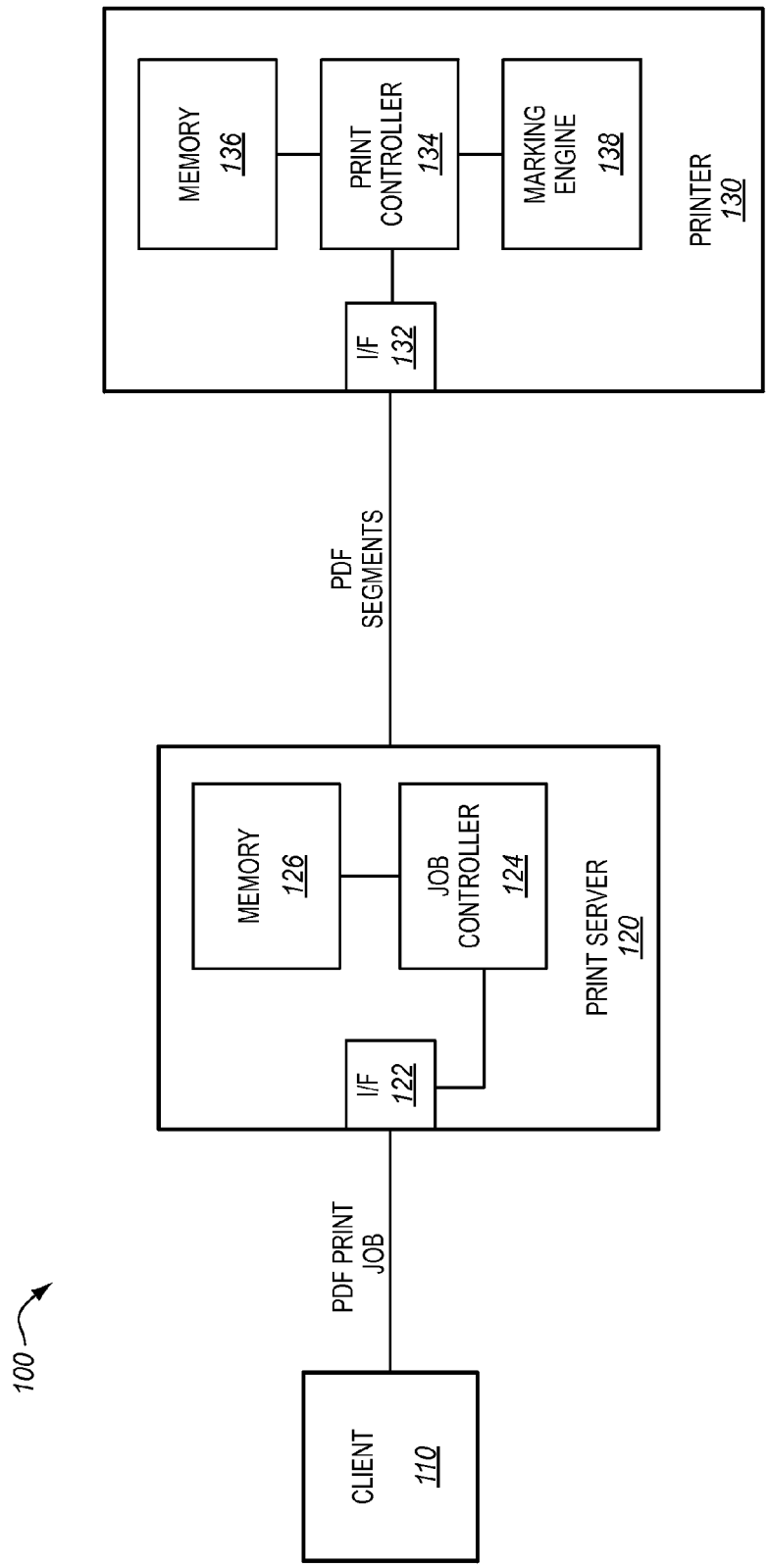
FIG. 1 is a block diagram of a printing system in an exemplary embodiment.

FIG. 1 is a block diagram of a printing system 100 in an exemplary embodiment. In printing system 100, incoming PDF print jobs from client 110 are received at print server 120 and assigned to printer 130 for printing. Print server 120 has been enhanced to dynamically split incoming PDF print jobs into segments if the PDF print jobs are too large. Specifically, printing system 100 splits a received PDF print job into independent child jobs/segments if printer 130 will encounter a substantial delay before it starts printing the PDF print job (e.g., a substantial delay before marking the first page of the PDF print job). Thus, print server 120 intelligently determines whether or not to split incoming PDF print jobs intended for printer 130. Because this technique reduces the time it takes to start marking a job, it provides a speed benefit even for jobs that are sent to printers with empty printing queues.

While print server 120 is shown as coupled with only one printer, print server 120 may manage the operations of multiple printers in a print shop environment. In this embodiment, print server 120 includes an interface (I/F) 122 (e.g., an Ethernet interface, wireless interface, etc.) for receiving print jobs from client 110. Print server 120 further includes a job controller 124 for handling print jobs received at print server 120, and a memory 126 (e.g., Random Access Memory (RAM), a hard disk, etc.) for storing print jobs from client 110. Controller 124 transmits PDF files to printer 130 for printing, and may be implemented as custom circuitry, as a processor executing programmed instructions, etc.

Printer 130 receives PDF files from print server 120 via interface 132, stores the PDF files in memory 136 (e.g., RAM or a hard disk), and marks physical media based upon the received PDF files. Printer 130 includes print controller 134, which manages the overall operations of printer 130, and may direct one or more Raster Image Processors (RIPs) to rasterize received print data. Rasterized data is sent to marking engine 138, which physically applies a colorant (e.g., toner, ink, etc.) onto print media to generate/mark a physical version of the print job. Printer 130 may utilize a continuous-forms marking engine, a cut-sheet marking engine, etc. In order to initiate printing/marking for a PDF file, printer 130 must access page tree information for that PDF file. However, the location of page tree information is indicated in a PDF trailer at the end of a PDF file. This is why printer 130 waits to receive an entire, complete PDF file before it attempts to initiate printing.

The particular arrangement, number, and configuration of components described herein is exemplary and non-limiting. Illustrative details of the operation of printing system 100 will be discussed with regard to FIG. 2, which illustrates a decision making process performed at print server 120 in order to dynamically split incoming PDF print jobs. Assume, for this embodiment, that one or more clients 110 are being operated by users to submit PDF print jobs to print server 120. The incoming PDF print jobs are intended for printing at printer 130.

Figure 2:
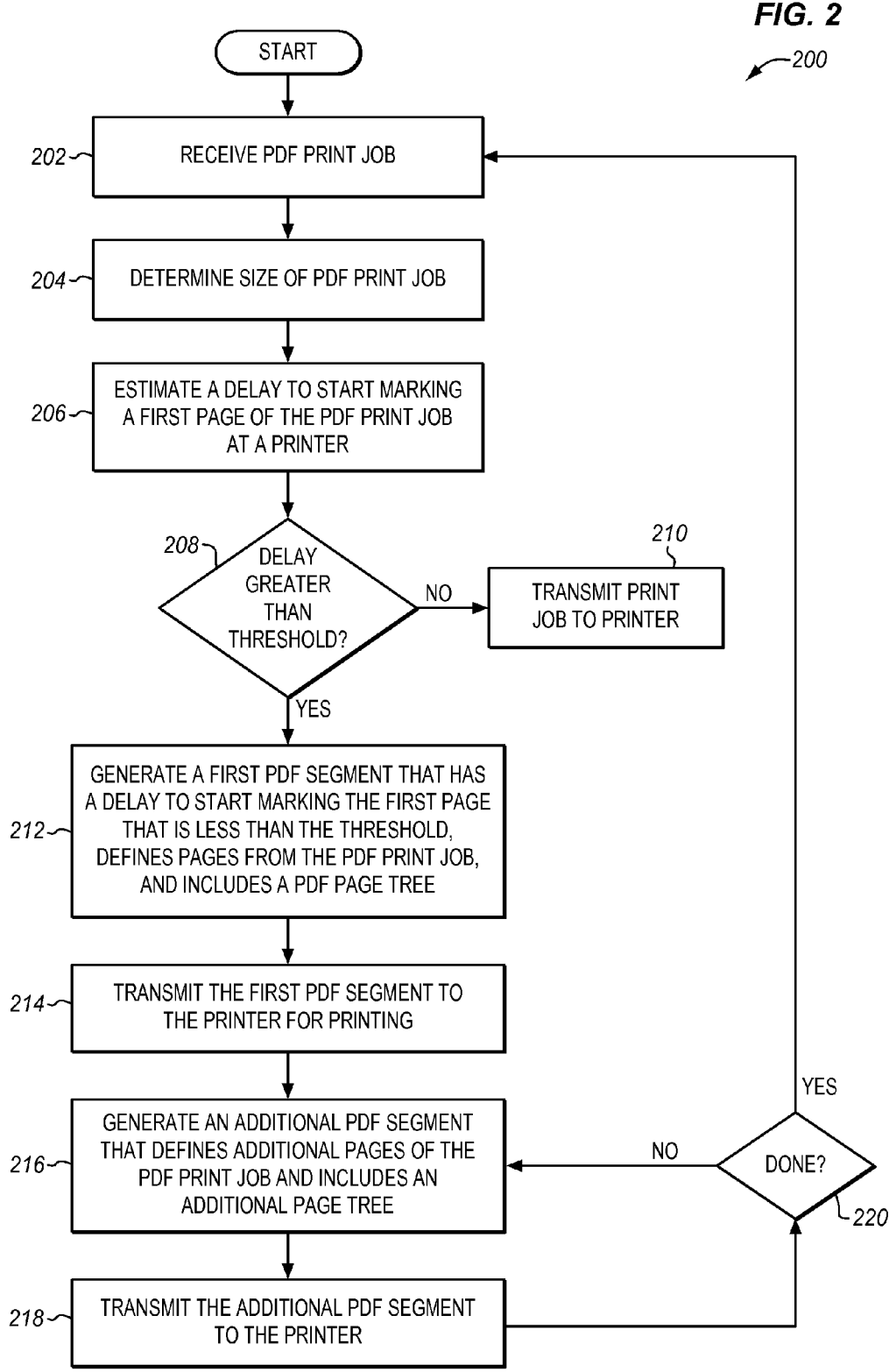
FIG. 2 is a flowchart illustrating a method for splitting a PDF print job in an exemplary embodiment.

FIG. 2 is a flowchart illustrating a method 200 for splitting a PDF print job in an exemplary embodiment. The steps of method 200 are described with reference to printing system 100 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, print server 120 receives a PDF print job (comprising one complete PDF file) from a client 110 via I/F 122. In step 204, job controller 124 determines the size of the PDF print job. The size of the print job may be the number of logical pages in the print job, the amount of memory 126 occupied by the print job, etc. In step 206, job controller 124 estimates a delay to start printing the PDF print job at printer 130 (e.g., a delay to start marking the first page of the print job). The delay is important to consider because it is time during which the marking engine of printer 130 remains idle and non-productive. As such, the delay should remain small in order to keep printer 130 productive.

The delay may depend on multiple variables, including, for example, the size of the print job, the speed of a communication channel between print server 120 and printer 130, the processing speed of print controller 134, the size of the page tree in the PDF print job, and other factors. In one embodiment, the delay is calculated as the size of the print job in pages, multiplied by an average/expected size of each page in memory, and divided by the data rate of the communication channel between print server 120 and printer 130. This type of delay indicates the amount of time it will take for printer 130 to receive the entire print job from print server 120. In a further embodiment, the delay also includes an amount of time indicating how long print controller 134 is expected to take processing the received PDF print job before marking engine 138 starts marking the first page.

After the expected delay of the PDF print job has been calculated, job controller 124 decides whether or not to split the PDF print job into smaller PDF segments. As used herein, a PDF segment is an independent PDF file that defines logical pages from the PDF print job, and has its own PDF page tree. Thus, each PDF segment may be independently processed by printer 130 as a separate job. In order to determine whether to split the original PDF print job, job controller 124 determines whether or not the estimated delay exceeds a threshold value (e.g., five minutes) in step 208.

If the delay is less than the threshold value, then the print job may be transmitted to printer 130 in step 210 without splitting the PDF print job, because the delay is within acceptable limits. Alternatively, if the delay to initiate printing/start marking the first page of the print job is greater than the threshold value, then the print job will cause too much idle time at printer 130, and should be split into independent, complete PDF segments. In this scenario, processing continues to step 212.

In step 212, job controller 124 starts to split the PDF print job into segments by generating a first PDF segment. To generate the first PDF segment, job controller 124 selects a size for the first PDF segment that will result in a smaller delay than the threshold, and populates the first PDF segment with pages from the job until the selected size is reached but not exceeded. The first PDF segment defines the first pages of the PDF print job. As a part of generating the first PDF segment as an independent and complete PDF file, job controller 124 generates a PDF page tree. The PDF page tree serves as a data structure that includes references to the pages and page objects for the first PDF segment. It is constructed using a tree (e.g., a balanced tree) which may improve performance for accessing pages. At this point in time, the first PDF segment serves as a "complete" PDF file that defines its own pages and includes its own page tree. Thus, in step 214, job controller 124 transmits the first PDF segment to printer 130 for printing.

In step 216, job controller 124 generates an additional PDF segment. Job controller 124 populates the additional PDF segment with more pages from the original PDF print job, and includes a PDF page tree in the additional PDF segment. The PDF page tree is used by printer 130 to process the pages defined by the additional PDF segment. In this manner, the additional PDF segment is also a discrete PDF file that may be independently processed at printer 130. In step 218, job controller 124 transmits the additional PDF segment to printer 130. The processes of generating segments and transmitting segments may be performed substantially in parallel in order to reduce and/or eliminate delays between transmitting/processing/printing individual segments.

In step 220, job controller 124 determines whether there are still additional portions of the original PDF print job that have not yet been segmented and submitted to printer 130. If there are still pages waiting to be sent to printer 130, then job controller 124 generates additional segments and transmits them in steps 216-218. This may continue iteratively in parallel with transmitting PDF segments to printer 130. Alternatively, if there are no pages left to assign to PDF segments, then the entire print job has been submitted and processing continues to step 202, where print server 120 waits for a print job.

During this process, printer 130 receives the individual PDF segments/files created by job controller 124. Each time a complete PDF segment is received at printer 130, print controller 134 searches the PDF segment to find and process the PDF page tree therein. Using the information in the PDF page tree, the logical pages defined by the PDF segment may be properly rasterized and printed at printer 130.

Using method 200, print server 120 is capable of identifying a PDF print job that would encounter substantial delays before printing at printer 130, and splitting the PDF print job into discrete, independent PDF segments/files that will each initiate printing at printer 130 more quickly. This reduces idle time at printer 130, which in turn increases the overall efficiency of the print shop.

Figure 3:
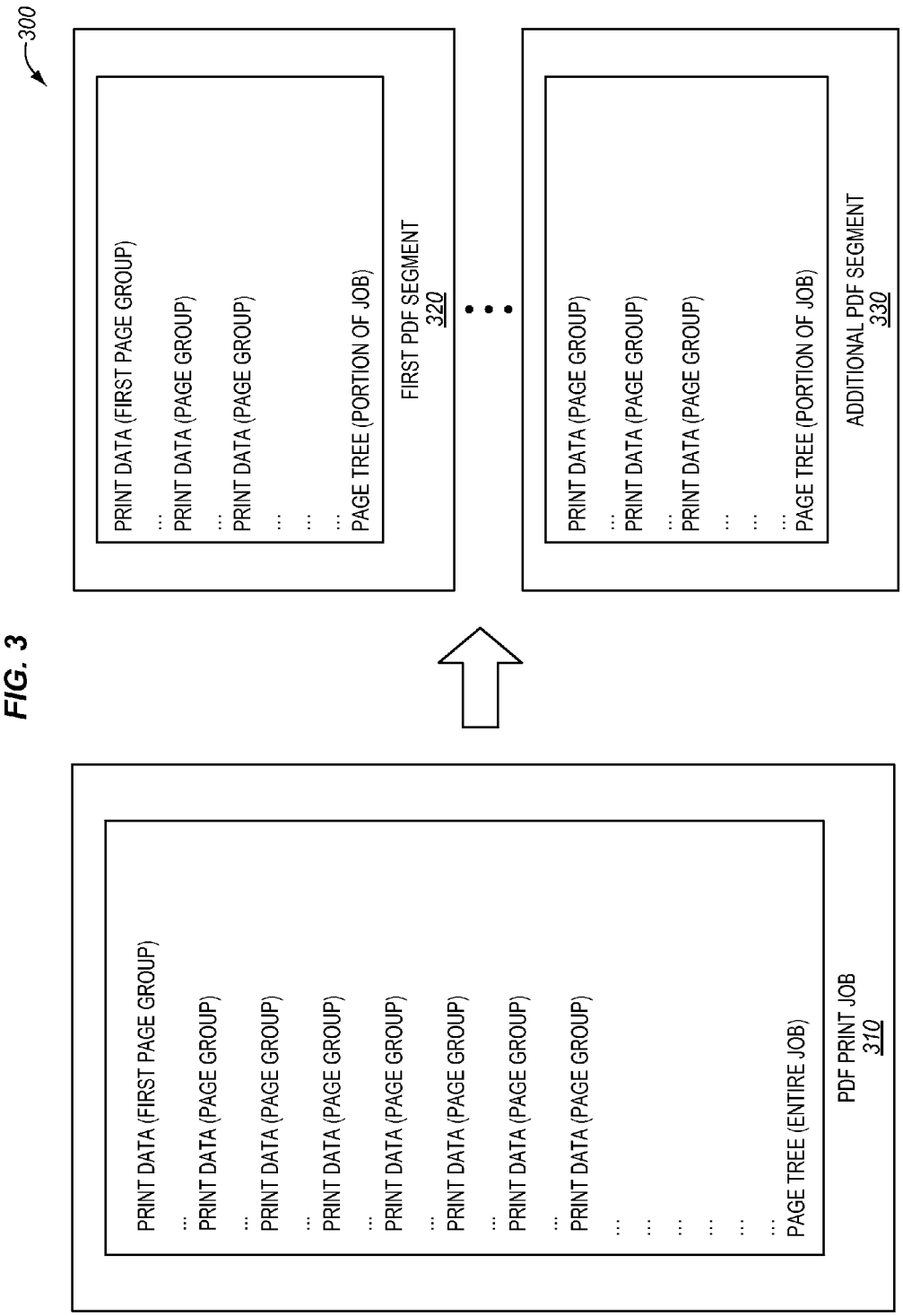
FIG. 3 is a block diagram illustrating a PDF print job that is split into segments in an exemplary embodiment.

FIG. 3 is a block diagram 300 illustrating a PDF print job that is split into independent segments in an exemplary embodiment. FIG. 3 illustrates that a PDF print job 310 includes PDF print data that defines a large number of pages. The pages may be logically divided into page groups via a job ticket or other instructions. As shown in FIG. 3, the print data within the PDF print job itself is not explicitly divided into page groups, but may categorized into page groups based on information in a job ticket (not shown). The location of a page tree is indicated by a PDF trailer (not shown), which itself is placed at the end of PDF print job 310. When job controller 124 splits PDF print job 310 into segments 320 and 330, it generates an individual page tree within each of the PDF segments. Specifically, each PDF segment includes its own page tree describing the pages of that segment. Splitting the original PDF print job in this manner ensures that the print job is printed in sequence, and provides a benefit in that the first page is printed faster than it would have been if PDF print job 310 had not been split.

Figure 4:
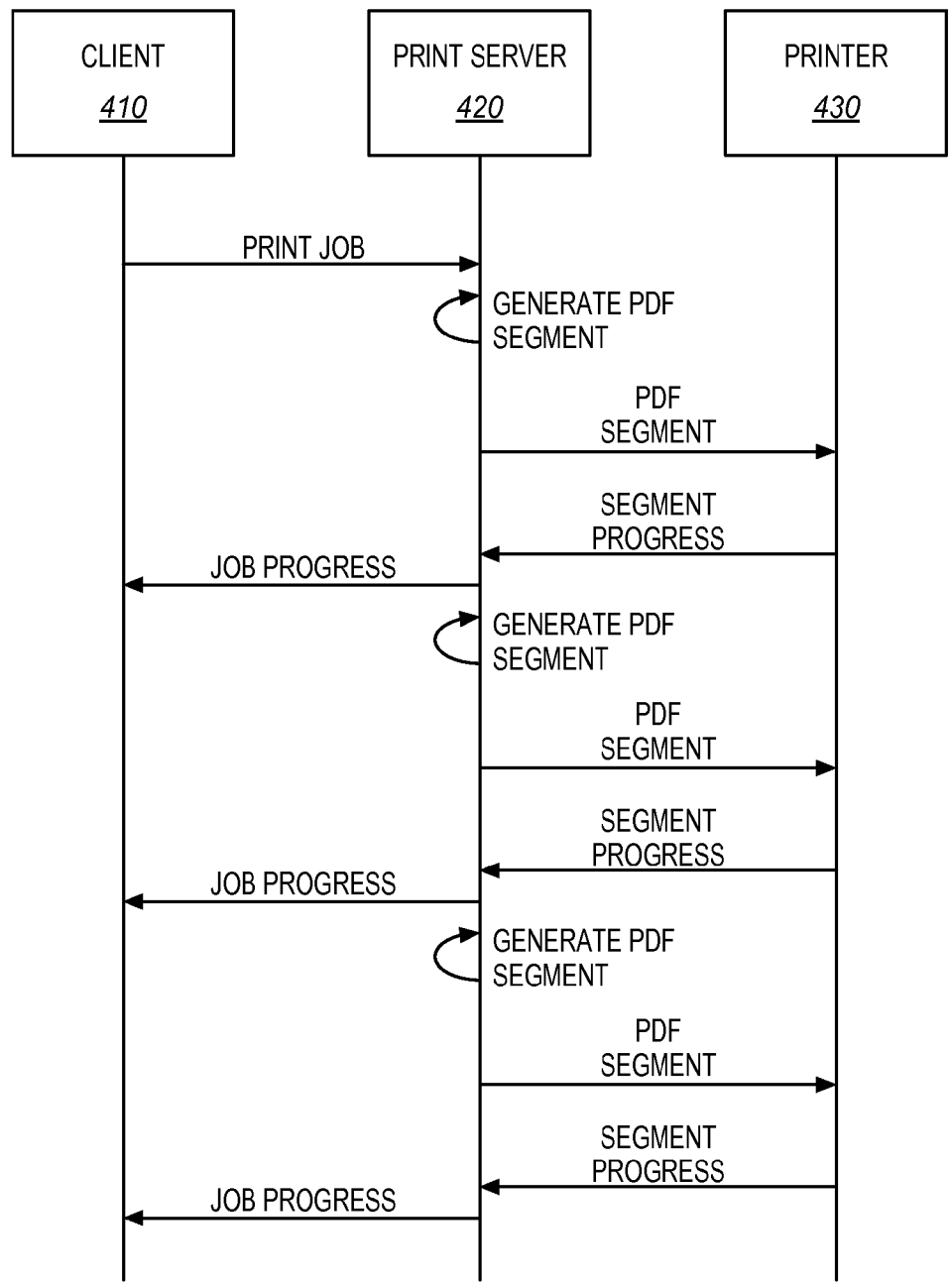
FIG. 4 is a message diagram illustrating communications between elements of a printing system that splits a PDF print job in an exemplary embodiment.

FIG. 4 is a message diagram 400 illustrating communications between elements of a printing system that splits a PDF print job in an exemplary embodiment. According to FIG. 4, a client 410, a print server 420 and a printer 430 cooperate in order to print a large PDF job (e.g., 200,000 pages) that would normally cause substantial printing delays at printer 430. In FIG. 4, client 410 initiates the process by sending the large PDF print job to print server 420. Print server 420 determines that the size of the PDF print job would cause a substantial delay at printer 430. Thus, a job controller at print server 420 generates a smaller, independent PDF segment from the original PDF print job, and transmits the PDF segment to printer 430. Since the PDF segment is smaller than the original print job and includes its own page tree (making the PDF segment an independent file), it will take less time to transmit PDF segment to printer 430 than to transmit the entirety of the PDF print job. This means that printer 430 is capable of processing and initiating printing of the PDF segment much faster than the PDF print job.

Printer 430 reports progress information (e.g., the number of pages of the segment that have been printed) to print server 420, which processes the progress information to indicate the progress of the entire print job (e.g., the total number of pages of the original print job that have been printed), and transmits this information to a user at client 410. While the first segment is being printed, a job controller of print server 420 generates an additional PDF segment for the next set of pages from the original PDF print job, and transmits the additional PDF segment to printer 430. Thus, printer 430 continues to print the pages of the PDF segments without delay, and print server 420 is given time to split the original print job into segments for transmission to printer 430. When print server 420 receives progress information for a given segment from printer 430, it aggregates the progress information from each of the segments in order to determine the progress of the entire original print job. A job controller of print server 420 then transmits a progress report/summary to a user of client 410, indicating the number of pages that have been printed for the print job as a whole. Thus, printer 430 is unaware that the PDF segments are actually one combined PDF job, while client 410 is unaware that the original PDF print job has been split into segments.

If a user sends an instruction to cancel the PDF print job, then the job controller of print server 420 stops generating PDF segments from the original PDF print job, identifies each PDF segment for the job that has been sent to printer 430, and cancels printing of each of the identified PDF segments at printer 430.

In a further embodiment, job controller 124 is capable of determining an amount of space available in memory 136. If the PDF print job exceeds the amount of space, then job controller 124 splits the PDF print job into smaller segments that will not cause an overflow at memory 136.

In a further embodiment, job controller 124 is able to identify boundaries between PDF page groups (e.g., mail pieces, billing statements for different customers, etc. as defined in a file/job ticket accompanying the PDF print job) in the original PDF print job. Job controller 124 then splits the PDF print job into segments at boundaries between PDF page groups. In this manner, each PDF segment may be generated without revising the page groups that were defined for the original print job.

In a still further embodiment, the job controller is able to identify finishing instructions for the PDF print job, and to split the PDF print job into segments at boundaries between finishing instructions (e.g., stapling, binding, hole punching, etc.). This ensures that pages which are stapled and/or bound together are included in the same PDF segment, ensuring that printer 130 may properly handle each PDF segment as an independent print job.

In yet another embodiment, job controller 124 may implement a size limit for PDF segments that follow the first PDF segment. For example, if the first PDF segment is expected to take five minutes to complete printing, job controller 124 may generate additional PDF segments that are sized to take the printer about five minutes to receive and process. This ensures that the additional PDF segments do not cause printer 130 to go idle.

Examples

In the following examples, additional processes, systems, and methods are described in the context of a print server that splits a large PDF print job into independent PDF segments for processing by a printer.

According to this example, a user submits a 200,000 page PDF print job to a print server. The PDF print job is accompanied by a Job Definition Format (JDF) job ticket that includes finishing instructions (in this case, stapling instructions) for the pages of the PDF print job. A job controller at the print server determines the number of pages in the PDF print job, and estimates the delay that will be encountered at a continuous-forms production printer before the printer starts printing the first page of the PDF print job. The delay is estimated as a linear function of the size of the print job. In this embodiment, print jobs that are larger than 25,000 pages are estimated to cause too much delay for the printer. Based on this information, the job controller decides that the PDF print job should be segmented, because otherwise the printer would wait too long before it started printing. This would result in a processing delay and/or out of memory condition at the printer.

After the job controller has determined that the print job should be segmented, the job controller selects a size limit for the segments. Instructions stored in memory at the print server indicate that the first segment should be no more than 25,000 pages, ensuring that the first page initiates printing quickly within a predefined threshold delay amount. The instructions also indicate that additional segments should be no more than 50,000 pages each. The additional segments have a larger page limit than the first segment because the printer will already be actively printing when the additional segments are sent to the printer, and is therefore less likely to go idle.

When assembling a PDF segment from the original PDF print job, the job controller adds consecutive PDF page groups to the segment until the segment gets close to the size limit. In this embodiment, the boundaries of each page group are determined based on information in the JDF job ticket. Specifically, the JDF job ticket includes information defining page exceptions (e.g., groups of pages designated for special treatment during or after printing), such as media groups/page groups or finishing instructions (e.g., staple groups). During segmentation, the job controller ensures that splitting does not occur within a group. This type of analysis may consider the boundaries for many different types of groups (e.g., media groups, staple groups, etc.). This is significant because splitting a PDF job across a staple group would cause the output from the printer to be incorrect. The job controller, in addition to considering page group boundaries/finishing instruction boundaries defined in the JDF job ticket, also tracks the size of the PDF segment it is generating. If adding another page group would cause the segment to exceed the size limit, then the segment is completed by generating and appending a PDF page tree for the segment. The segment is then transmitted to the printer and the job controller starts to assemble a new segment.

In addition to splitting the original PDF print job into independent PDF segments, the job controller splits the original JDF job ticket into independent JDF job ticket segments. Each JDF job ticket segment is a complete JDF file that corresponds with a different PDF segment, and is transmitted to the printer along with its corresponding PDF segment. Since each JDF job ticket segment corresponds with a different PDF segment, and since each PDF segment does not split a page group/finishing instruction, the JDF job ticket segments also do not split individual page groups/finishing instructions This ensures that the printer is capable of independently handling finishing instructions for each PDF segment without requesting further information from the print server.

Figure 5:
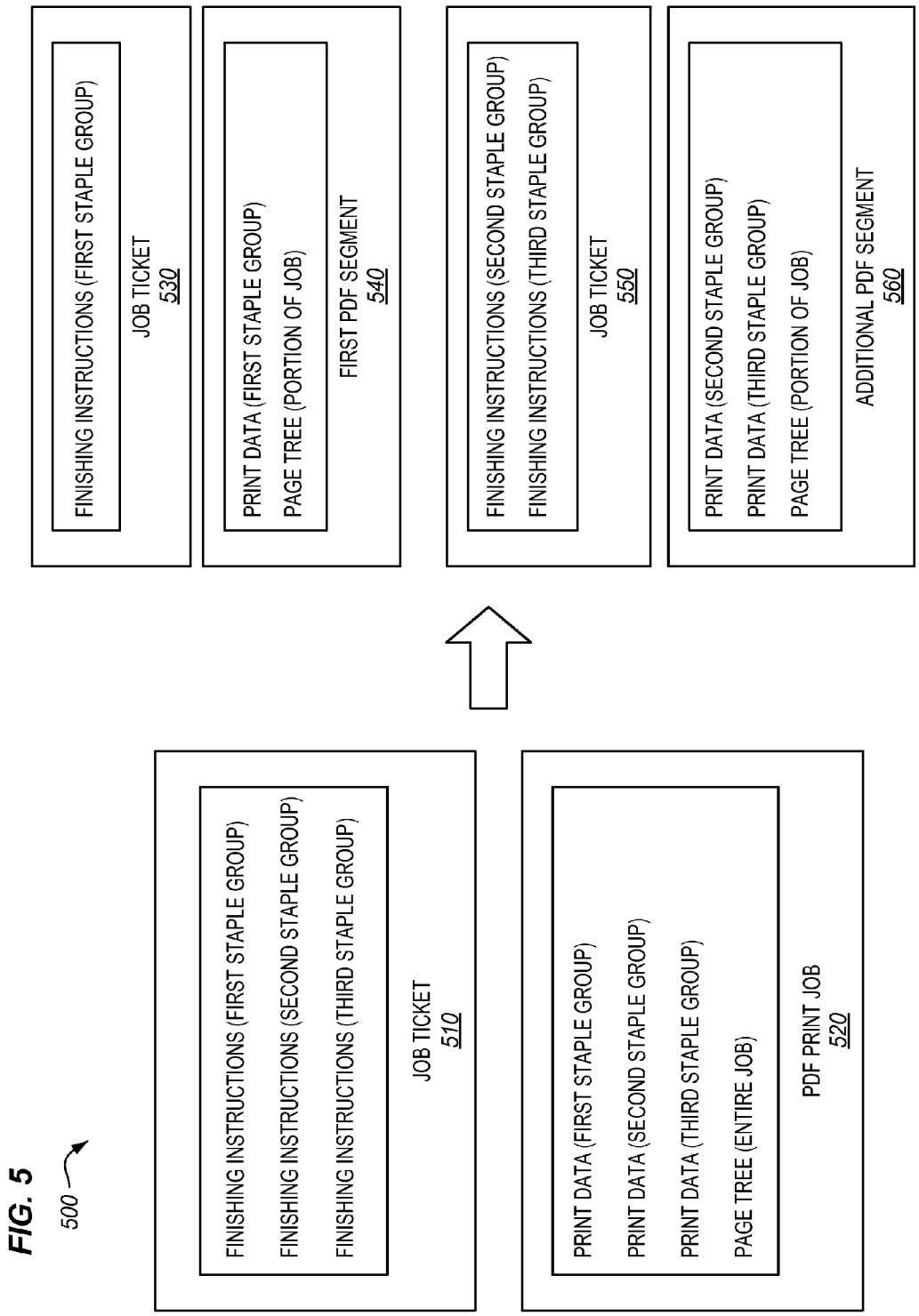
FIG. 5 is a block diagram illustrating a PDF print job an accompanying job ticket that are both split into segments in an exemplary embodiment.

FIG. 5 is a block diagram 500 illustrating a PDF print job 520 and an accompanying job ticket 510 that are both split into segments in an exemplary embodiment. Each set of finishing instructions within job ticket 510 is tied to a group of pages known as a "staple group" for print job 520. The boundaries of each staple group are defined by job ticket 510, and are not explicitly defined within print job 520. A job controller generates a first PDF segment 540, adding pages from PDF print job 520 based on the locations of the individual staple groups defined by job ticket 510 (e.g., in order to avoid a segment ending in the middle of a staple group). The job controller also generates a new JDF job ticket 530 that includes finishing instructions (e.g., an instruction to staple) for each of the staple groups for the first PDF segment. Job ticket 530 is then created and transmitted along with PDF segment 540 to the printer.

The job controller of the print server also generates a second job ticket 550 and an additional PDF segment 560, and transmits these to the printer. The printer therefore interprets each discrete PDF segment and accompanying job ticket as a complete print job, and reports its progress to the print server for these "child" jobs. The print server aggregates the progress information for each of the PDF segments, and reports the progress to the user as an aggregated page count for the entire job. In this manner, a user may seamlessly track the progress of the entire job, and the printer may handle each PDF segment as a separate print job, complete with job ticket. Furthermore, the pages of the original PDF print job start printing much more quickly.

Figure 6:
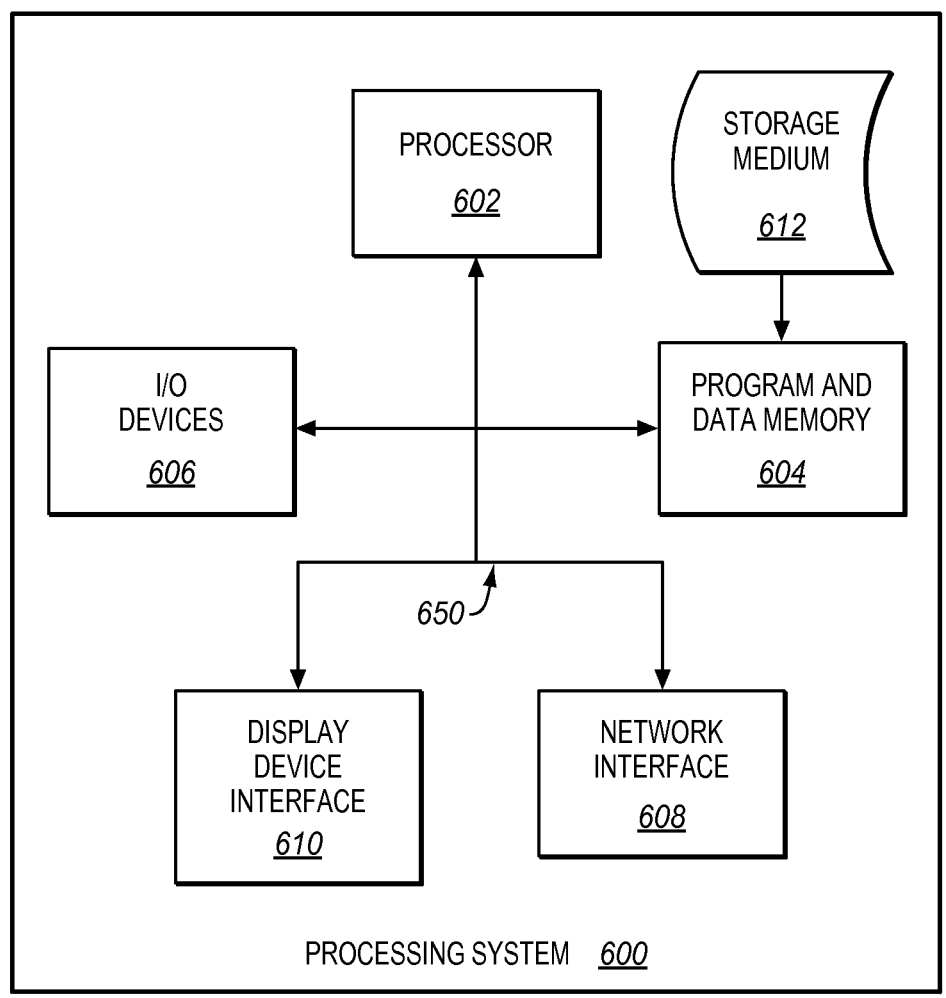
FIG. 6 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of print server 120 to perform the various operations disclosed herein. FIG. 6 illustrates a processing system 600 operable to execute a computer readable medium embodying programmed instructions to perform desired functions in an exemplary embodiment. Processing system 600 is operable to perform the above operations by executing programmed instructions tangibly embodied on computer readable storage medium 612. In this regard, embodiments of the invention can take the form of a computer program accessible via computer-readable medium 612 providing program code for use by a computer or any other instruction execution system. For the purposes of this description, computer readable storage medium 612 can be anything that can contain or store the program for use by the computer.

Computer readable storage medium 612 can be an electronic, magnetic, optical, electromagnetic, infrared, or semiconductor device. Examples of computer readable storage medium 612 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 600, being suitable for storing and/or executing the program code, includes at least one processor 602 coupled to program and data memory 604 through a system bus 650. Program and data memory 604 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 606 (including but not limited to keyboards, displays, pointing devices, etc.) can be coupled either directly or through intervening I/O controllers. Network adapter interfaces 608 may also be integrated with the system to enable processing system 600 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 610 may be integrated with the system to interface to one or more display devices, such as printing systems and screens for presentation of data generated by processor 602.

Although specific embodiments were described herein, the scope of the invention is not limited to those specific embodiments. The scope of the invention is defined by the following claims and any equivalents thereof.

We claim:

1. A system comprising:
a print server comprising:
an interface configured to receive a Portable Document Format (PDF) print job;
a job controller configured to determine a size of the PDF print job, and to estimate a delay to start marking a first page of the PDF print job at a printer based on the size;
the job controller is configured, in response to determining that the delay exceeds a threshold, to split the PDF print job into segments by:
generating a first PDF segment that has a delay to start marking the first page that is less than the threshold, wherein the first PDF segment defines pages from the PDF print job and includes a PDF page tree;
transmitting the first PDF segment to the printer for printing;
generating an additional PDF segment that defines additional pages of the PDF print job and includes an additional PDF page tree; and
transmitting the additional PDF segment to the printer.

2. The system of claim 1, wherein:
the job controller is configured to define a size limit for additional PDF segments, and to generate multiple additional PDF segments for the printer that each define additional pages of the PDF print job, include an additional PDF page tree, and do not exceed the size limit.

3. The system of claim 1, wherein:
the job controller is configured to generate the additional PDF segment while the first PDF segment is being transmitted to the printer.

4. The system of claim 1, wherein:
the job controller is configured to receive input from a user canceling the PDF print job, and to cancel printing of the first PDF segment and the additional PDF segment at the printer.

5. The system of claim 1, wherein:
the job controller is configured to present a summary to a user indicating a number of pages printed for the PDF print job based on the number of pages printed from the first PDF segment and the additional PDF segment.

6. The system of claim 1, wherein:
the job controller is configured to identify boundaries between PDF page groups for the PDF print job, and to split the PDF print job at a boundary between PDF page groups.

7. The system of claim 1, wherein:
the job controller is configured to identify finishing instructions for the PDF print job, and to split the PDF print job at a boundary between finishing instructions.

8. The system of claim 1, wherein:
the job controller is configured to analyze a job ticket for the PDF print job, to split the job ticket into a first job ticket segment defining how to process the first PDF segment and an additional job ticket segment defining how to process the additional PDF segment, to transmit the first job ticket segment to the printer with the first PDF segment, and to transmit the additional job ticket segment to the printer with the additional PDF segment.

9. A method comprising:
receiving a Portable Document Format (PDF) print job;
determining a size of the PDF print job;
estimating a delay to start marking a first page of the PDF print job at a printer based on the size; and
in response to determining that the delay exceeds a threshold, splitting the PDF print job into segments by:
generating a first PDF segment that has a delay to start marking the first page that is less than the threshold, wherein the first PDF segment defines pages from the PDF print job and includes a PDF page tree;
transmitting the first PDF segment to the printer for printing;
generating an additional PDF segment that defines additional pages of the PDF print job and includes an additional PDF page tree; and
transmitting the additional PDF segment to the printer.

10. The method of claim 9, further comprising:
defining a size limit for additional PDF segments; and
generating multiple additional PDF segments for the printer that each define additional pages of the PDF print job, include an additional PDF page tree, and do not exceed the size limit.

11. The method of claim 9, further comprising:
generating the additional PDF segment while the first PDF segment is being transmitted to the printer.

12. The method of claim 9, further comprising:
receiving input from a user canceling the PDF print job; and
cancelling printing of the first PDF segment and the additional PDF segment at the printer.

13. The method of claim 9, further comprising:
presenting a summary to a user indicating a number of pages printed for the PDF print job, based on the number of pages printed from the first PDF segment and the additional PDF segment.

14. The method of claim 9, further comprising:
identifying boundaries between PDF page groups within the PDF print job; and
splitting the PDF print job at a boundary between PDF page groups.

15. The method of claim 9, further comprising:
identifying finishing instructions for the PDF print job; and
splitting the PDF print job at a boundary between finishing instructions.

16. The method of claim 9, further comprising:
analyzing a job ticket for the PDF print job;
splitting the job ticket into a first job ticket segment defining how to process the first PDF segment and an additional job ticket segment defining how to process the additional PDF segment;
transmitting the first job ticket segment to the printer with the first PDF segment; and
transmitting the additional job ticket segment to the printer with the additional PDF segment.

17. A non-transitory computer readable medium embodying programmed instructions which, when executed by a processor, are operable for performing a method comprising:
receiving a Portable Document Format (PDF) print job;
determining a size of the PDF print job;
estimating a delay to start marking a first page of the PDF print job at a printer based on the size; and
in response to determining that the delay exceeds a threshold, splitting the PDF print job into segments by:
generating a first PDF segment that has a delay to start marking the first page that is less than the threshold, wherein the first PDF segment defines pages from the PDF print job and includes a PDF page tree;
transmitting the first PDF segment to the printer for printing;

generating an additional PDF segment that defines additional pages of the PDF print job and includes an additional PDF page tree; and transmitting the additional PDF segment to the printer.

18. The medium of claim 17, wherein the method further comprises:

defining a size limit for additional PDF segments; and generating multiple additional PDF segments for the printer that each define additional pages of the PDF print job, include an additional PDF page tree, and do not exceed the size limit.

19. The medium of claim 17, wherein the method further comprises:

generating the additional PDF segment while the first PDF segment is being transmitted to the printer.

20. The medium of claim 17, wherein the method further comprises:

receiving input from a user canceling the PDF print job; and cancelling printing of the first PDF segment and the additional PDF segment at the printer.

\* \* \* \* \*